Patented May 4, 1937

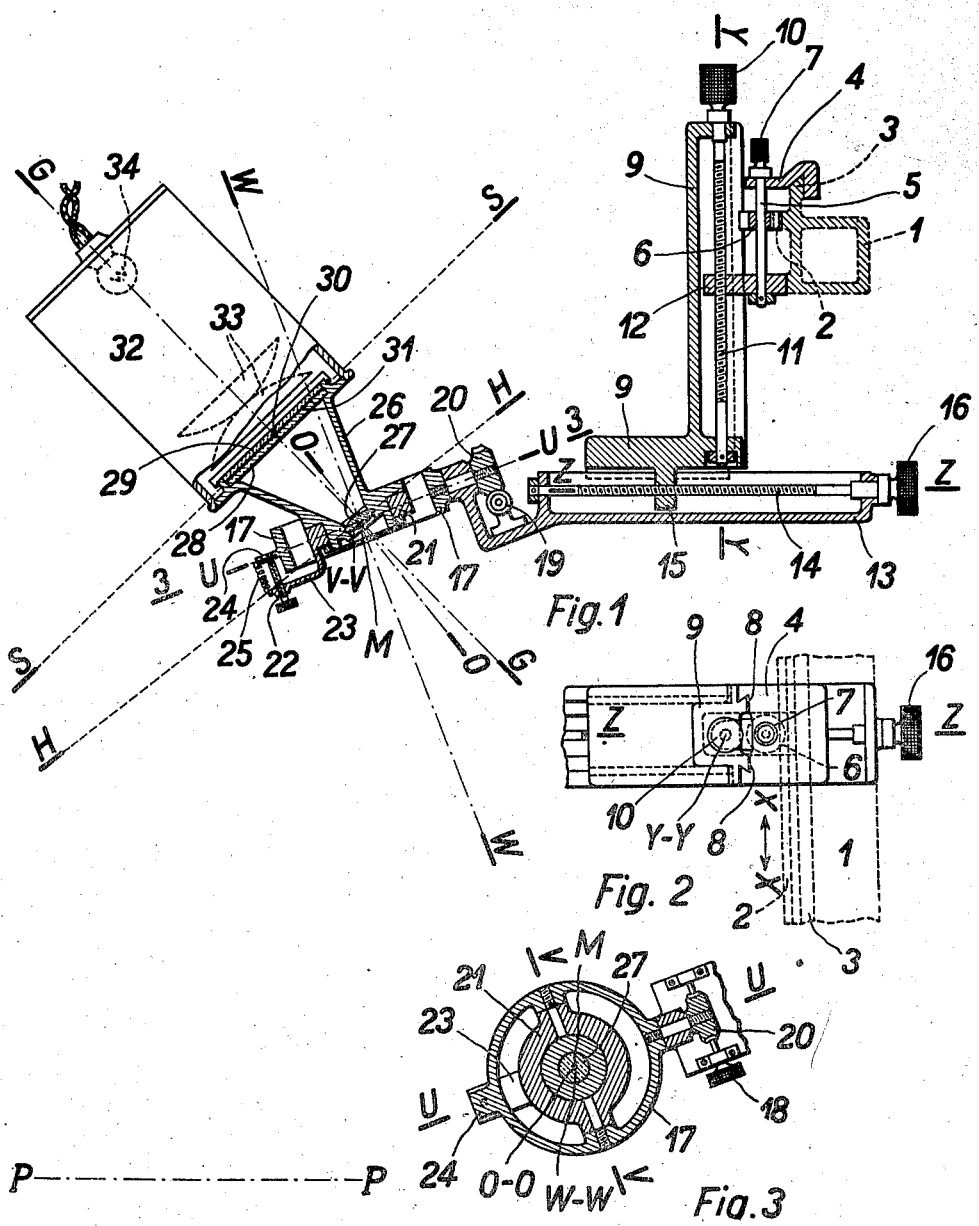

2,079,090

UNITED STATES PATENT OFFICE 2,079,090

CAMERA BEARING IN APPARATUS FOR PHOTOGRAMMETRICALLY PLOTTING OBLIQUE PHOTOGRAPHS TAKEN FROM AIRCRAFT

Otto von Gruber, Jena, Germany, assignor to the firm Carl Zeiss, Jena, Germany

Application November 18, 1936, Serial No. 111,394
In Germany November 28, 1935

1 Claim. (Cl. 33—20)

The invention concerns a bearing for a camera projecting an image on a plane of projection in apparatus which work on the principle of double projection and are used for photogrammetrically plotting image plates exposed on aircraft obliquely at a definite angle $\alpha$ to the horizontal plane, the bearing having a three-dimensional system of cross-slides which supports by means of a Cardan link a bearing body on which the camera is mounted in such a manner that this camera is rotatable about an axis containing the optical centre of the camera objective, that this optical centre coincides with the centre of the Cardan link, and that the axis of rotation of the camera intersects the interior axis of rotation of the Cardan link at right angles.

To ensure in such apparatus a simplified orientation of the images, the invention provides a camera bearing permitting inclination of the image plate of the camera to the axis of rotation W—W of the camera at an angle $\beta$ in such a manner that this plate is intersected by the axis W—W at a point lying as near the plate plumb point as possible, that the objective and the image plate are so positioned relatively to each other as to make the principal plane H—H of the objective pass through the line in which the emulsion side S—S of the image plate intersects the projection plane P—P at a medial distance of this plane P—P from the objective, and that the exterior axis of rotation of U—U of the Cardan link is inclined to the projection surface P—P at an angle $\gamma$ equal to the sum of the said two angles $\alpha$ and $\beta$, less 90°.

The reasons for the said construction of the camera mounting providing a simplified orientation of the images are the following: It is a well known fact that, in radial triangulation, points near the plate plumb line are especially insensitive to errors of orientation when directions of lines are to be determined which connect these points to any other points. Hence, it is expedient to so position the orientation parts of the projection camera that, when the orientation is changed, the displacements of the projections of such points on the projection surface are as few and as unequivocal as possible, which is the aim of the invention.

The new camera bearing acts in such a manner that the projection on the plane of projection P—P of the point lying in the axis of rotation W—W of the camera remains completely motionless when the camera is rotated about the said axis W—W, that the projection of this point is displaced along a line parallel to the interior axis of rotation V—V of the Cardan link when the camera is rotated about the exterior axis of rotation U—U of the Cardan link, and that the projection of this point is displaced at right angles to the line parallel to the interior axis V—V when the camera is rotated about this axis V—V.

In the accompanying drawing, which illustrates the invention and represents a projection camera and its mounting, Figure 1 shows the camera in elevation, Figure 2 is a partial plan view of the camera mounting, and Figure 3 shows the camera mounting in a section through the dash-line in Figure 1.

1 is a rod of the plotting apparatus of which the projection camera forms part. The rod 1 is provided lengthwise with a rack 2 and a knife-edge 3. The knife-edge 3 supports a camera holder 4 traversed by a shaft 5 which is connected to a toothed wheel 6 in mesh with the rack 2. By means of a milled head 7, the toothed wheel 6 can be so rotated as to displace the holder 4 on the rod 1 in the direction X—X. A slide 9 is displaceable along the dove-tail guide 8 of the holder 4 in a direction Y—Y at right angles to the direction of displacement X—X, displacements of the slide 9 relative to the holder 4 being effected by means of a milled head 10 and a threaded spindle 11 whose axis coincides with the direction of displacement Y—Y and which is in mesh with the thread of a nut piece 12 of the holder 4. On the slide 9 is mounted a slide 13 displaceable in a direction Z—Z at right angles to the directions of displacement X—X and Y—Y. On the slide 13 is rotatably mounted a threaded spindle 14 whose axis coincides with the direction of displacement Z—Z and which engages in the thread of a nut piece 15 of the slide 9. Rotating the spindle 14 by means of a milled head 16 entails a displacement of the slide 13 relative to the slide 9. The slide 13 is provided with an annular body 17 rotatable about an axis U—U which lies in a plane containing the directions of displacement Y—Y and Z—Z and is inclined at an angle $\gamma=20°$ to the direction of displacement Z—Z. The annular body 17 is rotatable relatively to the slide 13 by means of a milled head 18 and a worm gear 19, 20. A support 21 is so mounted in the annular body 17 as to be rotatable about an axis V—V intersecting the axis of rotation U—U at right angles at a point M. The support 21 can be rotated relatively to the annular body 17 by means of a screw 22 which is disposed in a bracket 23 of the body 21 and pressed by means of a spring 25 against a plate 24 integral with the body 17. The housing 26 of a projection camera is so disposed on the support 21 as to be rotatable about an axis W—W intersecting the axis of rotation V—V at right angles at the point M. The objective 27 of the camera is mounted in the housing 26 in such a manner that its optical centre coincides with the point M and that its optical axis O—O and the axis of rotation W—W embrace an angle of 17°. 28 is a glass plate which is fixed into the housing 26 and lies against the emulsion side of the image plate 29 to be projected. The glass plate 28 is so positioned in the housing 26 that its surface S—S coinciding with the emulsion side of the image plate 29 is at right angles to a straight line G—G lying in the plane determined by the optical axis O—O of the objective 27 and the axis of rotation W—W, and that its said surface includes an angle of 6° together with the axis O—O and an angle of 23° together with the axis of rotation W—W. That surface of the glass plate 28 which coincides with the emulsion side S—S and is, accordingly, inclined at an angle $\beta=67°$ to the axis of rotation W—W bears two marks, namely a point mark 30 coinciding with the point of intersection of the said surface and the straight line G—G, and a line mark 31 containing both the point mark 30 and the point of intersection of the axis O—O and the said surface, the purpose of the marks 30 and 31 being to facilitate adjusting the image plate 29 in the camera. A housing 32 placed on the housing 26 includes the illumination device, which consists of condenser lenses 33 and an incandescent bulb 34. P—P designates a plane which is parallel to the directions of displacement X—X and Z—Z and is indicative of a medial position of the projection surface. When the image plate 29 has been exposed, for instance, at 43° to the horizontal plane, and assumes the position shown in the drawing, the plane P—P makes together with the emulsion side S—S of the image plate the said angle $\alpha=43°$ and contains the line in which the emulsion side S—S and the principal plane H—H of the objective 27 intersect each other at an angle of 6° on account of the described reciprocal positions of the objective 27 and the surface bearing the marks 30 and 31. The planes H—H, S—S and P—P are, accordingly, so positioned relatively to each other as to fulfill the Scheimpflug condition of sharp definition, the angles $\alpha$, $\beta$ and $\gamma$ corresponding, as required, to the equation $\gamma=\alpha+\beta-90°$.

The point at which the axis of rotation W—W and the emulsion layer of the image plate 29 intersect each other, is near the margin of the image plate. This position facilitates the orientation of the image plate 29 as compared to the usual position, in which the axis of rotation W—W coincides with the axis O—O or the said straight line G—G.

I claim:

A bearing for a camera projecting an image on a plane of projection (P—P) in apparatus for photogrammetrically plotting image plates exposed on aircraft obliquely at a definite angle ($\alpha$) to the horizontal plane, the camera containing an image plate, an objective and an illumination system disposed behind the image plate, the objective being so positioned relatively to the image plate that the principal plane (H—H) of the objective passes through the line in which the emulsion side (S—S) of the image plate intersects the said projection plane (P—P) at a medial distance of this plane (P—P) from the objective, a three-dimensional system of cross slides supporting the camera, a bearing body mounted on this system of cross slides by means of a Cardan link, the camera being so mounted on the bearing body that it is rotatable about an axis (W—W) containing the optical centre (M) of the camera objective, that this optical centre (M) coincides with the centre of the Cardan link, and that the axis of rotation (W—W) of the camera intersects at right angles the interior Cardan axis (V—V) of the Cardan link, the image plate being inclined to the axis of rotation (W—W) of the camera at such an angle ($\beta$) that this plate is intersected by the axis of rotation (W—W) at a point lying as near the plate plumb line as possible, and the exterior Cardan axis (U—U) of the Cardan link being inclined to the said projection surface (P—P) at an angle ($\gamma$) equal to the sum of the said two angles ($\alpha$ and $\beta$), less 90°.

OTTO v. GRUBER.